United States Patent [19]

Nukada et al.

[11] Patent Number: 5,290,928
[45] Date of Patent: Mar. 1, 1994

[54] PROCESS FOR PREPARING OXYTITANIUM PHTHALOCYANINE HYDRATE CRYSTAL

[75] Inventors: Katsumi Nukada; Masakazu Iijima; Akira Imai; Katsumi Daimon, all of Minami-ashigara, Japan

[73] Assignee: Fuji Xerox Co., Ltd., Tokyo, Japan

[21] Appl. No.: 928,416

[22] Filed: Aug. 12, 1992

Related U.S. Application Data

[63] Continuation-in-part of Ser. No. 757,218, Sep. 10, 1991.

[30] Foreign Application Priority Data

Nov. 22, 1990 [JP] Japan .................................. 2-316072
Aug. 16, 1991 [JP] Japan .................................. 3-229689

[51] Int. Cl.$^5$ .............................................. C09B 67/50
[52] U.S. Cl. .................................. 540/141; 540/143; 540/142; 540/144
[58] Field of Search .............. 540/141, 144, 142, 143; 106/410, 412

[56] References Cited

U.S. PATENT DOCUMENTS 4,898,799  2/1990  Fujimaki et al. ..................... 540/141
5,059,355 10/1991  Ono et al. ............................ 106/412

FOREIGN PATENT DOCUMENTS 200007   11/1986  European Pat. Off. .
266219    5/1988  European Pat. Off. .
384470    8/1990  European Pat. Off. .
62-67094  3/1987  Japan .
63-20365  1/1988  Japan .
63-20366  1/1988  Japan .
64-17066  1/1989  Japan .
1-299874 12/1989  Japan .
2-215866  8/1990  Japan .
2-215867  8/1990  Japan .
2-289658 11/1990  Japan .
3-54264   3/1991  Japan .
3-62039   3/1991  Japan .

OTHER PUBLICATIONS

Grant and Hackh's Chemical Dictionary, (New York, McGraw-Hill Books, (1987)), pp. 163-164, and 231-232.
Ono et al., Chem. Abs., vol. 114, (1991), Abs. 14915m.
Ono et al., Chem. Abs., vol. 114, (1991), Abs. 14916n.
Yashiro et al., Chem. Abs., vol. 115, (1991), Abs. 170936v.
Suzuki et al., Chem. Abs., vol. 107, (1987), Abs. 87142x.
Takai et al., Chem. Abs., vol. 115, (1991), Abs. 102827k.
Chemical Abstracts, vol. 109, (1988), Abs. 8037g, Sakikubo et al.

*Primary Examiner*—John M. Ford
*Assistant Examiner*—P. K. Sripada
*Attorney, Agent, or Firm*—Oliff & Berridge

[57] ABSTRACT

A process for preparing an oxytitanium phthalocyanine hydrate crystal which, when dried at 100° C. and 0.1 mmHg for 8 hours and then allowed to stand in air at room temperature for 12 hours, has a structural formula of TiOPc·$(H_2O)_n$, wherein Pc represents a phthalocyanine nucleus, and n represents a number of from 0.15 to 1, and elemental analysis values of C: 65.0 to 66.3%, H: 2.5 to 3.1%, and N: 18.5 to 19.3% is disclosed, which process comprises the steps of: mechanically grinding a mixture of oxytitanium phthalocyanine and an inorganic salt to convert the crystal form of the oxytitanium phthalocyanine to a crystal form showing a distinct peak in its X-ray diffraction pattern at a Bragg angle ($2\theta \pm 0.2°$) of 27.3° and treating the resulting oxytitanium phthalocyanine crystal with a mixed solvent of water and a water-insoluble organic solvent. The oxytitanium phthalocyanine hydrate crystal obtained has doped therein a specific amount of water of crystallization and is stable in a solvent and also stable when used as an electrophotographic photoreceptor.

10 Claims, 7 Drawing Sheets

PROCESS FOR PREPARING OXYTITANIUM PHTHALOCYANINE HYDRATE CRYSTAL

CROSS REFERENCE TO RELATED APPLICATION

This application is a continuation-in-part of application Ser. No. 07/757,218 filed on Sep. 10, 1991.

FIELD OF THE INVENTION

This invention relates to a process for preparing an oxytitanium phthalocyanine hydrate crystal useful as a charge generating material of an electrophotographic photoreceptor.

BACKGROUND OF THE INVENTION

Oxytitanium phthalocyanine is known to exhibit several different crystal forms in addition to α- and β-crystal forms reported in JP-A-63-20365 and JP-A-63-20366 (the term "JP-A" as used herein means an "unexamined published Japanese patent application"). Of the known crystal forms, those showing the maximum peak in their X-ray diffraction patterns at a Bragg angle ($2\theta \pm 0.2°$) of 27.3° have been attracting particular attention for use as a charge generating material of electrophotographic photoreceptors because of their high photosensitivity. For example, the oxytitanium phthalocyanine disclosed in JP-A-62-67094, which has the maximum diffraction peak at a Bragg angle ($2\theta \pm 0.2°$) of 27.3°, exhibits very high sensitivity. However, these species proved insufficient in stability on repeated use, stability of the crystal form in a coating composition, and dispersibility in a coating composition.

Processes for obtaining oxytitanium phthalocyanine crystals having the maximum diffraction peak at a Bragg angle ($2\theta \pm 0.2°$ C.) of 27.3° include, in addition to the process disclosed in JP-A-62-67094 supra, a process comprising a general acid paste process followed by a solvent treatment as disclosed in JP-A-63-20365 and JP-A-1-299874, a process comprising heating or milling in an organic solvent in the presence of sulfuric acid or sulfonic acid as disclosed in JP-A-2-215866 and JP-A-2-215867, and a process comprising milling for making oxytitanium phthalocyanine amorphous, followed by a methanol treatment at room temperature or under heating as disclosed in JP-A-3-54264 and JP-A-3-62039. However, any of the crystals obtained is poor in crystal form stability in a solvent and easily converted to a more stable form.

JP-A-64-17066 discloses a process in which oxytitanium phthalocyanine is milled together with sodium chloride and polyethylene glycol. However, the resulting crystal form is easily converted to other crystal forms depending on temperature because of use of a solvent. Moreover, the particle size is difficult to control, resulting in non-uniformity in particle size. JP-A-2-289658 discloses a process comprising mechanically grinding oxytitanium phthalocyanine until it is converted into amorphous or the X-ray diffraction results in substantially no peak or no more than a slight peak at a Bragg angle ($2\theta \pm 0.2°$) of 27.3°, and then treating the powder with a solvent. However, mechanical grinding to make the crystal show a peak at a Bragg angle ($2\theta \pm 0.2°$) of 27.3° requires a very long time and is not suited for industrial production. In addition, the resulting crystals are non-uniform in particle size, and it is difficult to obtain in a stable manner an oxytitanium phthalocyanine hydrate crystal doped with a specific amount of water of crystallization.

SUMMARY OF THE INVENTION

An object of the present invention is to provide a process for preparing an oxytitanium phthalocyanine hydrate crystal doped with a specific amount of water of crystallization which has the maximum X-ray diffraction peak at a Bragg angle ($2\theta \pm 0.2°$) of 27.3° and which is stable not only in a solvent but on use as an electrophotographic photoreceptor.

Some of the present inventors have found that doping of oxytitanium phthalocyanine having the maximum peak at a Bragg angle ($2\theta \pm 0.2°$) of 27.3° with a specific amount of water of crystallization provides an oxytitanium phthalocyanine hydrate crystal which is stable not only in a solvent but also on use as an electrophotographic photoreceptor. According to this technique, an oxytitanium phthalocyanine hydrate crystal having a uniform size can be obtained efficiently by pouring a sulfuric acid solution of oxytitanium phthalocyanine into an organic solvent or a mixed solvent of water and an organic solvent to obtain oxytitanium phthalocyanine having the maximum diffraction peak at a Bragg angle ($2\theta \pm 0.2°$) of 27.3° and then treating the crystal with a solvent. This technique, nevertheless, is still disadvantageous in that a large quantity of sulfuric acid should be used in the acid paste process, leaving the problem of waste liquid handling, which has been a bar to application of the technique to mass production.

As a result of further studies on the above-described technique, it has surprisingly been found that when oxytitanium phthalocyanine is mechanically ground together with an inorganic salt, uniformly and finely pulverized oxytitanium phthalocyanine having high crystallinity and showing the maximum diffraction peak at a Bragg angle ($2\theta \pm 0.2°$) of 27.3° can be obtained in a very short time and with good efficiency and that a desired oxytitanium phthalocyanine hydrate crystal can be obtained by subjecting the resulting oxytitanium phthalocyanine to a solvent treatment.

That is, the present inventors have noted that the crystal form and size of oxytitanium phthalocyanine before being treated with a solvent are of importance for obtaining an oxytitanium phthalocyanine hydrate crystal doped with a specific amount of water of crystallization that has the maximum diffraction peak at a Bragg angle ($2\theta \pm 0.2°$) of 27.3° and that is stable in a solvent and also stable when used as an electrophotographic photoreceptor, and thus reached the present invention.

The present invention relates to a process for preparing an oxytitanium phthalocyanine hydrate crystal which, when dried at 100° C. and 0.1 mmHg for 8 hours and then allowed to stand in air at room temperature for 12 hours, has a structural formula of TiOPc·(H$_2$O)$_n$, wherein Pc represents a phthalocyanine nucleus, and n represents a number of from 0.15 to 1, and elemental analysis values of C: 65.0 to 66.3%, H: 2.5 to 3.1%, and N: 18.5 to 19.3%, which process comprises the steps of: mechanically grinding a mixture of oxytitanium phthalocyanine and an inorganic salt to convert the crystal form of the starting oxytitanium phthalocyanine to a crystal form showing a clear peak in its X-ray diffraction pattern at a Bragg angle ($2\theta \pm 0.2°$) of 27.3°; and treating the resulting oxytitanium phthalocyanine crystal with a mixed solvent of water and a water-insoluble organic solvent.

DETAILED DESCRIPTION OF THE INVENTION

Oxytitanium phthalocyanine which can be used as a starting material may have any crystal form and can be synthesized by any known processes. For example, it may be obtained by reacting phthalonitrile with titanium tetrachloride in an appropriate organic solvent followed by hydrolysis, and it may also be obtained by reacting diiminoisoindoline and a titanium tetraalkoxide in an appropriate organic solvent.

The starting oxytitanium phthalocyanine and an inorganic salt are mixed and mechanically ground to convert the crystal form of the starting oxytitanium phthalocyanine to a crystal form showing a distinct X-ray diffraction peak at a Bragg angle ($2\theta \pm 0.2°$) of 27.3°. Examples of the oxytitanium phthalocyanine after mechanical grinding include one having distinct diffraction peaks at Bragg angles of 7.2°, 14.2°, 17.8°, 24.1°, and 27.2°.

The inorganic salt which can be used in the mechanical grinding step is not particularly limited, and examples thereof include sodium chloride, sodium bromide, sodium iodide, sodium sulfate, magnesium carbonate, and sodium carbonate. Considering that the inorganic salt must be removed after grinding, water-soluble inorganic salts are preferred. The oxytitanium phthalocyanine and the inorganic salt are generally used at a weight ratio of from 1/0.1 to 1/20. From the standpoint of grinding efficiency and the treating capacity, a preferred weigh&: ratio is from 1/0.5 to 1/5.

Grinding is preferably dry grinding and can be carried out with any known means, such as a ball mill, a sand mill, a kneader, and a mortar.

The thus ground oxytitanium phthalocyanine is treated with a mixed solvent of water and a water-insoluble organic solvent to obtain an oxytitanium phthalocyanine hydrate crystal.

Examples of the water-insoluble organic solvent include benzene, toluene, monochlorobenzene, dichlorobenzene, n-octane, and methylene chlcride. The amount ratio of water to organic solvent is generally from 99/1 to 50/50 by weight, and preferably from 97/3 to 80/20. The amount of the solvent to be used ranges generally from 1 to 100 times, and preferably from 5 to 50 times, the weight of the oxytitanium phthalocyanine. The solvent treatment is usually effected at a temperature of from room temperature to 100° C., and preferably from 50 to 100° C., for a period of from 1 to 5 hours.

After being dried at 100° C. and 0.1 mmHg for 8 hours and then allowed to stand in air at room temperature for 12 hours, the thus obtained oxytitanium phthalocyanine hydrate crystal has a structural formula of TiOPc·(H$_2$O), wherein Pc represents a phthalocyanine nucleus, and n represents a number of from 0.15 to 1, and elemental analysis values of C: 65.0 to 66.3%, H: 2.5 to 3.1%, and N: 18.5 to 19.3%. The oxytitanium phthalocyanine hydrate crystal preferably has a weight loss of from 0.6 to 3% on heating up to 200° C.

The resulting oxytitanium phthalocyanine hydrate crystal preferably has a particle size of not more than 0.15 μm and shows the maximum peak in its X-ray diffraction pattern at a Bragg angle ($2\theta \pm 0.2°$) of 27.3°. Examples thereof include one of the crystals showing distinct diffraction peaks at Bragg angles of 9.5°, 14.3°, 18.0°, 24.0°, and 27.3°.

In the present invention, the X-ray diffraction pattern is the measurement results of intensities of the Bragg angle ($2\theta$) with respect to CuK$_{60}$ characteristic X-ray (wavelength: 1.541$\theta$). The measurement conditions are as follows:

Apparatus: X-ray diffractiometer (RAD-RC produced by Rigaku K.K.)
Target: Cu (1.54050 Å)
Voltage: 40.0 KV
Stars angle: 5.00 deg
Stop angle: 40.00 deg
Step angle: 0.020 deg It has not yet been clarified why an oxytitanium phthalocyanine hydrate crystal which is stable in a solvent and also stable when used as an electrophotographic photoreceptor can be obtained by using oxytitanium phthalocyanine having the maximum diffraction pattern at a Bragg angle ($2\theta \pm 0.2°$) of 27.3°. In view of the fact that the oxytitanium phthalocyanine before a solvent treatment and that after a solvent treatment are similar in crystal form, both having the maximum diffraction peak at a Bragg angle ($2\theta \pm 0.2°$) of 27.3°, it is considered that the lattice strain accompanying crystal transformation is so small, providing an oxytitanium phthalocyanine hydrate crystal having small lattice defects and a uniform particle size.

The oxytitanium phthalocyanine hydrate crystal of the present invention is useful as a photoconductive material to provide an electrophotographic photoreceptor.

Illustrative examples of the structure of the photoreceptor using the oxytitanium phthalocyanine hydrate crystal of the present invention are explained below by referring to FIGS. 13 and 14.

FIGS. 13-(a) through (d) schematically show embodiments of layer constitution of photoreceptors having a laminate structure. The photoreceptor shown in FIG. 13-(a) is composed of conductive substrate 1 having thereon charge generating layer 2 and charge transporting layer 3 in this order. The photoreceptor shown in FIG. 13-(b) is composed of conductive substrate 1 having thereon charge transporting layer 3 and charge generating layer 2 in this order. The photoreceptors shown in FIGS. 13-(c) and (d) additionally have subbing layer 4 on conductive substrate 1. FIGS. 14-(a) and (b) show photoreceptors having a single layer structure, in which photoconductive layer 5 is provided on conductive substrate 1 with or without subbing layer 4.

Where a photoreceptor has a laminate structure as shown in FIG. 13, the charge generating layer is comprised of the oxytitanium phthalocyanine hydrate crystal of the present invention and a binder resin. The binder resin to be used is selected from a wide range of insulating resins as well as organic photoconductive polymers, e.g., poly-N-vinyl carbazole, polyvinyl anthracene, and polyvinyl pyrene. Preferred examples of the binder resin include insulating resins, such as polyvinyl butyral, polyarylates (e.g., a polycondensate of bisphenol A and phthalic acid), polycarbonates, polyesters, phenoxy resins, vinyl chloride-vinyl acetate copolymers, polyvinyl acetate, acrylic resins, polyacrylamide, polyamides, polyvinyl pyridine, cellulose resins, urethane resins, epoxy resins, casein, polyvinyl alcohol, and polyvinyl pyrrolidone.

The charge generating layer is formed by coating on a conductive substrate a coating composition prepared by dispersing the oxytitanium phthalocyanine hydrate crystal of the present invention in a solution of the binder resin in an organic solvent. Examples, of the organic solvent include those incapable of dissolving the lower layer on which the charge generating layer is to be coated. A compounding ratio of the oxytitanium phthalocyanine hydrate crystal to the binder resin ranges generally from 40/1 to 1/10, and preferably from 10:1 to 1:4, by weight. If the ratio of the oxytitanium phthalocyanine hydrate crystal is too high, the stability of the coating composition tends to be reduced. If it is too low, the sensitivity of the charge generating layer tends to be reduced.

The charge transporting layer of the laminate structure is comprised of a charge transporting material and a binder resin. Any of known charge transporting materials including polycyclic aromatic compounds, e.g., anthracene, pyrene, and phenanthrene; compounds having a nitrogen-containing heterocyclic ring, e.g., indole, carbazole, and imidazole; pyrazoline compounds, hydrazone compounds, triphenylmethane compounds, triphenylamine compounds, enamine compounds, and stilbene compounds, may be employed.

Also included in usable charge transporting materials are photoconductive polymers, such as poly-N-vinyl carbazole, halogenated poly-N-vinyl carbazole, polyvinyl anthracene, poly-N-vinylphenyl anthracene, polyvinyl pyrene, polyvinyl acridine, polyvinyl acenaphthylene, polyglycidyl carbazole, pyreneformaldehyde resins, and ethyl carbazole-formaldehyde resins. These photoconductive polymers may be used alone for formation of a charge transporting layer without the aid of a binder resin.

The same binder resins as used in the charge generating layer can be used in the charge transporting layer.

Figure 14A:
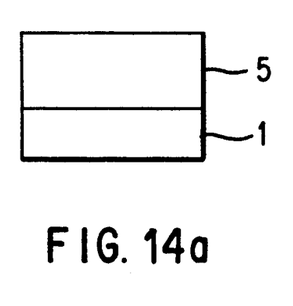
Figure 14B:
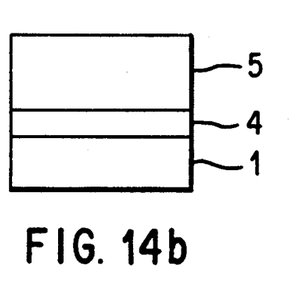

The charge transporting layer can be formed by coating a substrate with a coating composition comprising the above-described charge transporting material, a binder resin, and an organic solvent incapable of dissolving the lower layer on which the change transporting layer to be coated. A compounding ratio of the charge transporting material to the binder resin usually ranges from 5/1 to 1/5 by weight. The charge transporting layer usually has a thickness of from about 5 to 50 μm.

Where a photoreceptor has a single layer structure as shown in FIG. 14, the photosensitive layer is a photoconductive layer comprising a binder resin having dispersed therein a charge transporting material and the oxytitanium phthalocyanine hydrate crystal according to the present invention. A compounding ratio of the charge transporting material to the binder resin preferably ranges from 1/20 to 5/1 by weight, and a compounding ratio of the oxytitanium phthalocyanine hydrate crystal to the charge transporting material preferably ranges from about 1/10 to 10/1 by weight. The charge transporting material and binder resin to be used may be the same as described above. Formation of the photoconductive layer can be effected in the same manner as described above.

Any of conventional conductive substrates known for electrophotographic photoreceptors can be used in the present invention.

If desired, a subbing layer may be provided on the conductive substrate.

The present invention is now illustrated in greater detail with reference to Synthesis Examples and Examples, but it should be understood that the present invention is not deemed to be limited thereto. All the parts and percents are by weight unless otherwise indicated.

SYNTHESIS EXAMPLE 1

Figure 1:
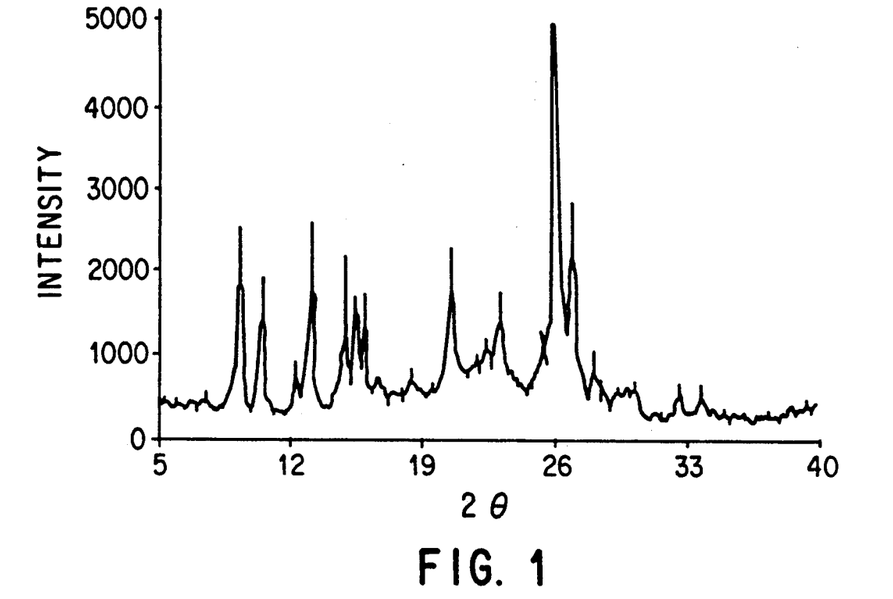
FIGS. 1 through 3 are each a powder X-ray diffraction pattern of the oxytitanium phthalocyanine crystal obtained in Synthesis Examples 1 to 3, respectively.

Thirty parts of 1,3-diiminoisoindoline and 17 parts of titanium tetrabutoxide were added to 200 parts of 1-chloronaphthalene, and the mixture was allowed to react at 190° C. for 5 hours in a nitrogen stream. The reaction mixture was filtered, and the filter cake was washed successively with aqueous ammonia, water, and acetone to obtain 40 parts of an oxytitanium phthalocyanine crystal. The powder X-ray diffraction pattern of the resulting oxytitanium phthalocyanine crystal is shown in FIG. 1.

SYNTHESIS EXAMPLE 2

Figure 2:
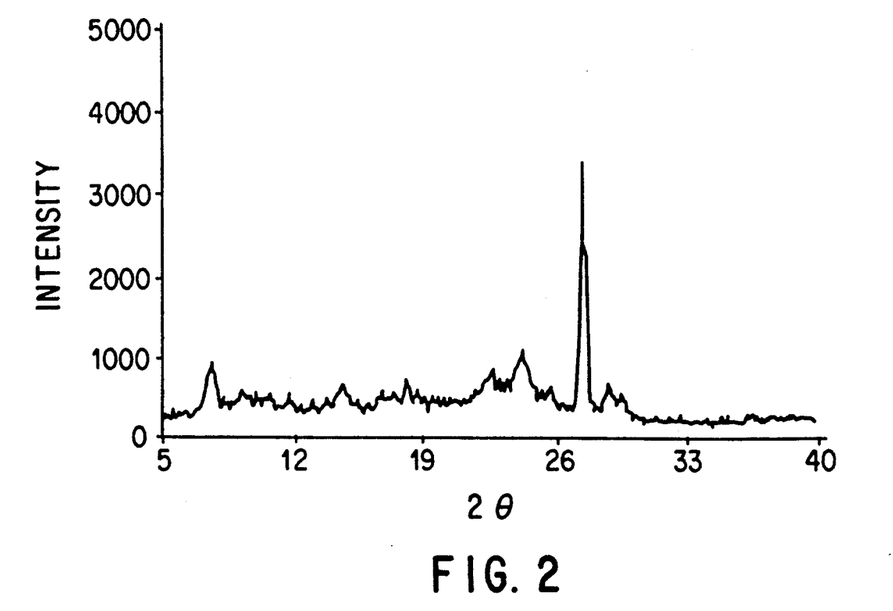

To 750 mμ of α-chloronaphthalene was added 97.5 parts of phthalodinitrile, followed by thoroughly stirring in a nitrogen stream. To the mixture was added dropwise 22 ml of titanium tetrachloride, and the temperature was gradually elevated up to 200° C., at which the mixture was allowed to react for 3 hours. After completion of the reaction, the reaction mixture was allowed to cool to 100° C. The precipitated crystal was collected by filtration and washed successively with 200 ml of α-chloronaphthalene having previously been heated to 100° C., 300 ml of α-chloronaphthalene, and 300 ml of methanol. The crystal was dispersed in 800 ml of methanol and refluxed under heating for 1 hours. The crystal was collected by filtration, dispersed in 700 ml of distilled water, and treated at 60° C. for 1 hour. The above washing treatment with distilled water was repeated 10 times. The finally recovered filtrate had a pH of 6.0. The resulting wet cake was freeze-dried to obtain 70 parts of an oxytitanium phthalocyanine crystal. The powder X-ray diffraction pattern of the resulting oxytitanium phthalocyanine crystal is shown in FIG. 2.

SYNTHESIS EXAMPLE 3

Figure 3:
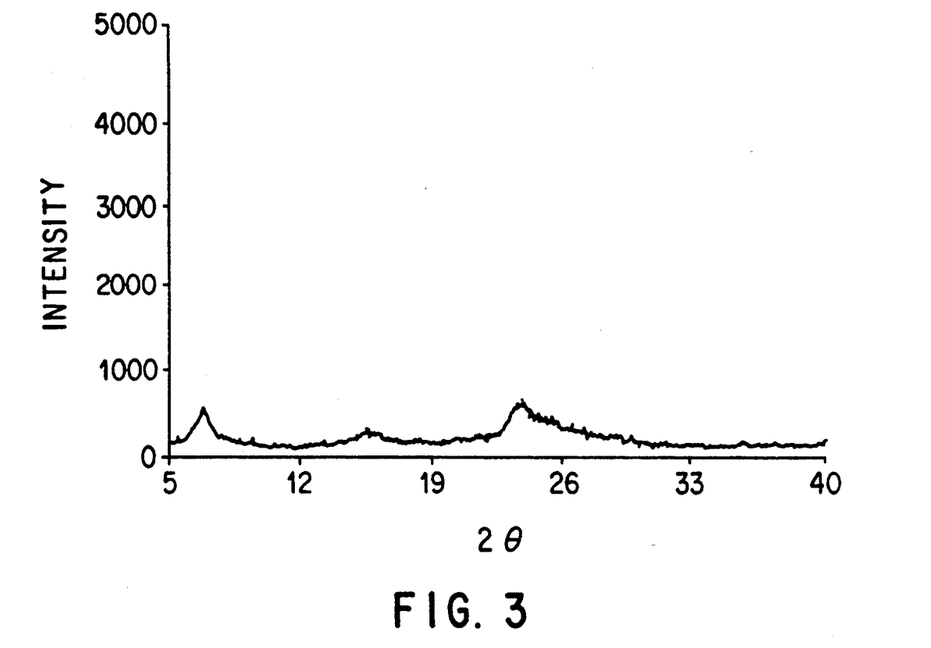

Twenty parts of the oxytitanium phthalocyanine crystal obtained in Synthesis Example 1 were dissolved in 1,000 parts of 97% sulfuric acid at 5° C/, and the solution was poured into 13,000 parts of ice-water. The precipitated crystal was collected by filtration, thoroughly washed successively with dilute aqueous ammonia and distilled water, and dried to obtain 16 parts of an oxytitanium phthalocyanine crystal. A powder X-ray diffraction pattern of the resulting oxytitanium phthalocyanine crystal is shown in FIG. 3.

EXAMPLE 1

Figure 4:
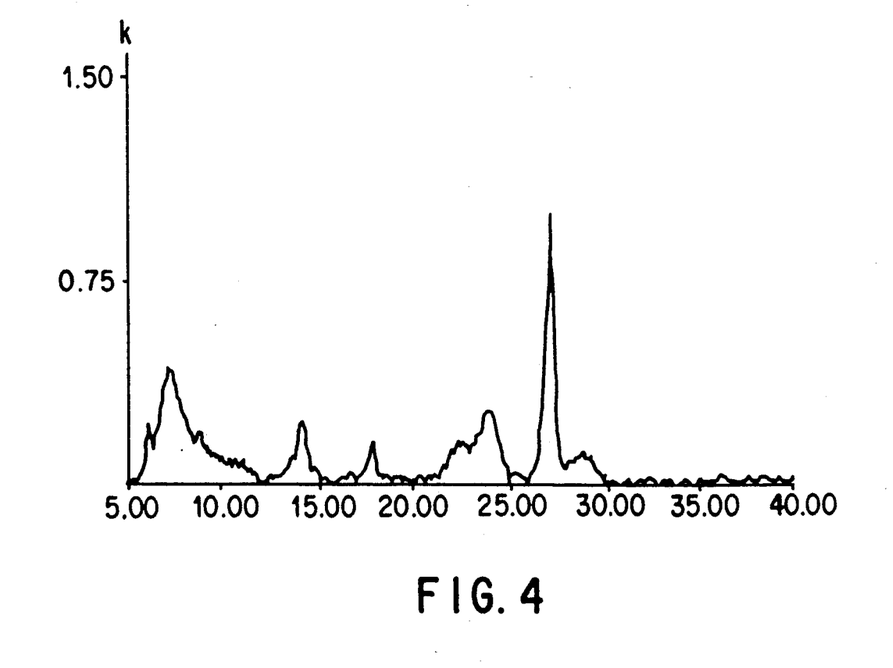
FIG. 4 is a powder X-ray diffraction pattern of the oxytitanium phthalocyanine crystal obtained after grinding in Example 1.

Five parts of the oxytitanium phthalocyanine crystal obtained in Synthesis Example 1 and 10 parts of sodium chloride were ground in an automatic mortar ("LABO-MILL UT-21" manufactured by Yamato Kagaku) for 3 hours, then sufficiently washed with distilled water and dried to obtain 4.8 parts of an oxytitanium phthalocyanine crystal. The powder X-ray diffraction pattern of the resulting powder is shown in FIG. 4. The pattern revealed a distinct peak at 27.3°.

Figure 5:
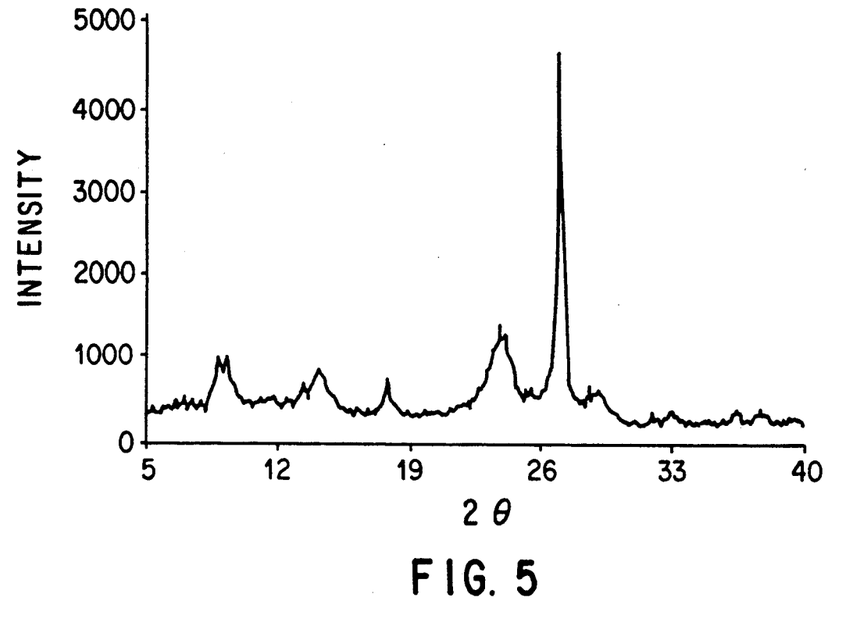
FIG. 5 is a powder X-ray diffraction pattern of the oxytitanium phthalocyanine hydrate crystal obtained in Example 1.
Figure 12:
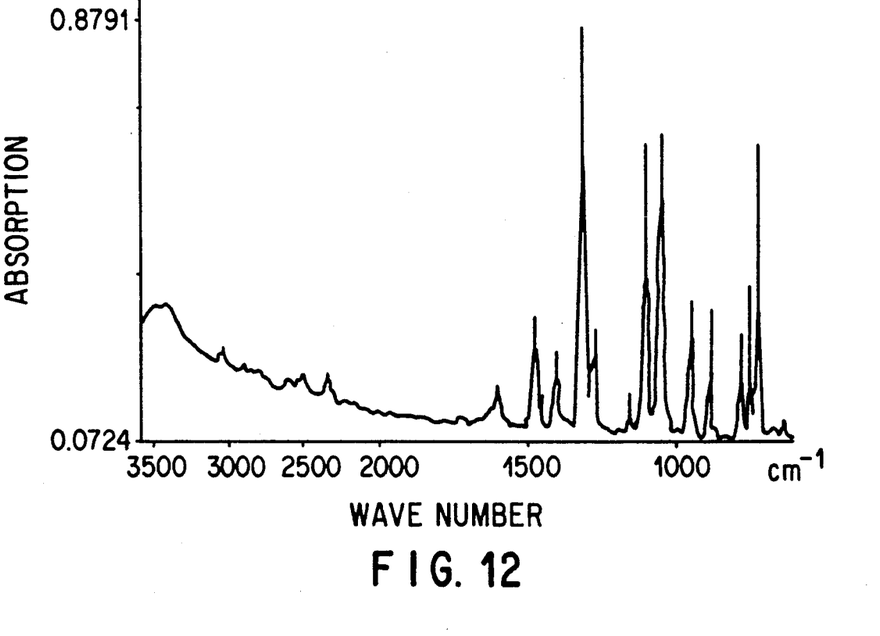
FIG. 12 is an infrared absorption spectrum of the oxytitanium phthalocyanine hydrate crystal obtained in Example 1.
Figure 13A:
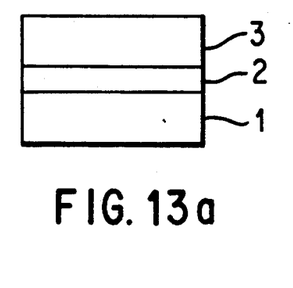
FIGS. 13(a),(b),(c),(d) and 14(a),(b) each schematically illustrate embodiments of the layer structure of the electrophotographic photoreceptor prepared by using the oxytitanium phthalocyanine hydrate crystal of the present invention.
Figure 13B:
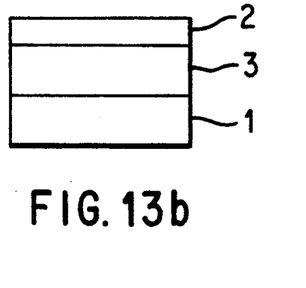
Figure 13C:
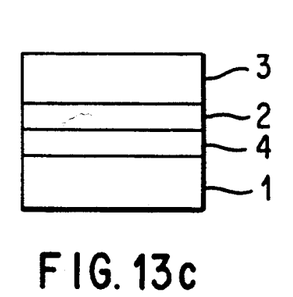
Figure 13D:
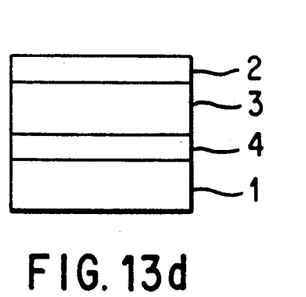

Two parts of the resulting oxytitanium phthalocyanine crystal were stirred in a mixed solvent of 20 parts of distilled water and 2 parts of monochlorobenzene at 50° C. for 1 hour. The mixture was filtered, and the filter cake was thoroughly washed with methanol and dried to obtain 1.6 parts of an oxytitanium phthalocyanine hydrate crystal. The powder X-ray diffraction pattern of the resulting hydrate crystal is shown in FIG. 5. The crystal had a uniform particle size between 0.05 and 0.1 μm. The infrared absorption spectrum of the crystal is shown in FIG. 12. The spectrum of FIG. 12 revealed an absorption at around 3,300 cm$^{-1}$ which is characteristic of water of crystallization.

The resulting crystal was dried at 100° C., 0.1 mmHg for 8 hours and then allowed to stand in air at room temperature for 12 hours. The thus conditioned crystal had a structural formula of $TiOPc \cdot (H_2O)_{0.36}$.

EXAMPLE 2

Five parts of the oxytitanium phthalocyanine crystal obtained in Synthesis Example 2 were ground and subjected to a solvent treatment in the same manner as in Example 1. The powder X-ray diffraction patterns of the crystals after the grinding and after the solvent treatment were similar to FIG. 4 and FIG. 5, respectively. The resulting hydrate crystal had a uniform particle size of from 0.05 to 0.1 μm.

When the resulting crystal was, dried at 100° C., 0.1 mmHg for 8 hours and then allowed to stand in air at room temperature for 12 hours, the crystal had a structural formula of $TiOPc \cdot (H_2O)_{0.42}$.

EXAMPLE 3

Five parts of the oxytitanium phthalocyanine crystal obtained in Synthesis Example 3 were ground and subjected to a solvent treatment in the same manner as in Example 1. The powder X-ray diffraction patterns of the crystals after the grinding and after the solvent treatment were similar to FIG. 4 and FIG. 5, respectively. The resulting hydrate crystal had a uniform particle size of from 0.03 to 0.09 μm.

When the resulting crystal was dried at 100° C., 0.1 mmHg for 8 hours and then allowed to stand in air at room temperature for 12 hours, the crystal had a structural formula of $TiOPc \cdot (H_2O)_{0.49}$.

COMPARATIVE EXAMPLE 1

Figure 6:
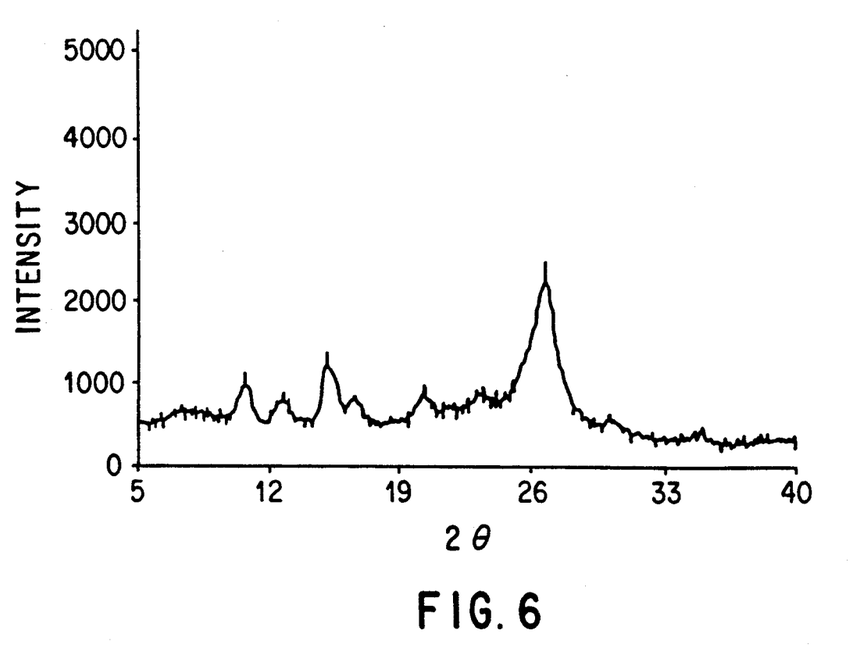
FIG. 6 is a powder X-ray diffraction pattern of the oxytitanium phthalocyanine crystal obtained after grinding in Comparative Example 1.

Five parts of the oxytitanium phthalocyanine crystal obtained in Synthesis Example 1 were ground in the same manner as in Example 1, except that no sodium chloride was used. The powder X-ray diffraction pattern of the resulting crystal is shown in FIG. 6.

Figure 7:
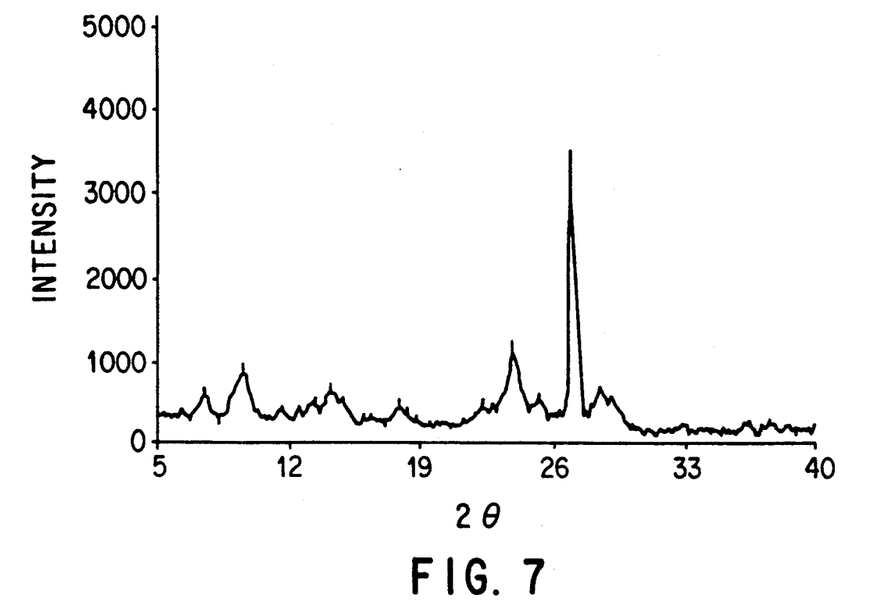
FIG. 7 is a powder X-ray diffraction pattern of the oxytitanium phthalocyanine hydrate crystal obtained in Comparative Example 1.

Two parts of the resulting oxytitanium phthalocyanine crystal were stirred in a mixed solvent consisting of 20 parts of distilled water and 2 parts of monochlorobenzene at 50° C. for 1 hour. The mixture was filtered, and the filter cake was thoroughly washed with methanol and dried to recover 1.6 parts of an oxytitanium phthalocyanine hydrate crystal. The powder X-ray diffraction pattern of the resulting oxytitanium phthalocyanine hydrate crystal is shown in FIG. 7. The crystal had a non-uniform particle size ranging from 0.05 and 0.3 μm.

When the resulting crystal was dried at 100° C., 0.1 mmHg for 8 hours and then allowed to stand in air at room temperature for 12 hours, the crystal had a structural formula of $TiOPc \cdot (H_2O)_{0.29}$.

COMPARATIVE EXAMPLE 2

Figure 8:
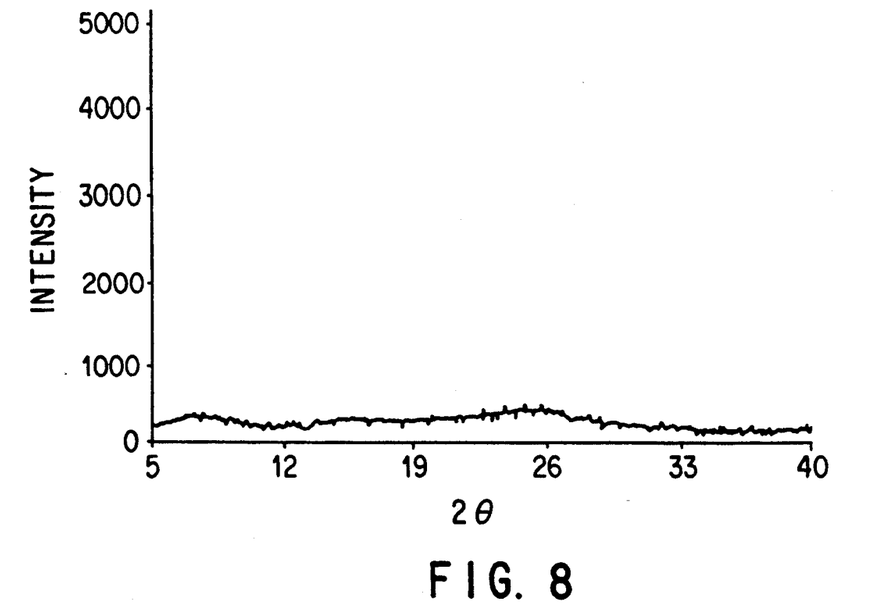
FIG. 8 is a powder X-ray diffraction pattern of the oxytitanium phthalocyanine crystal obtained after grinding in Comparative Example 2.

The same procedure as in Comparative Example 1 was repeated, except for extending the grinding time to 50 hours. The powder X-ray diffraction pattern of the resulting crystal is shown in FIG. 8.

Figure 9:
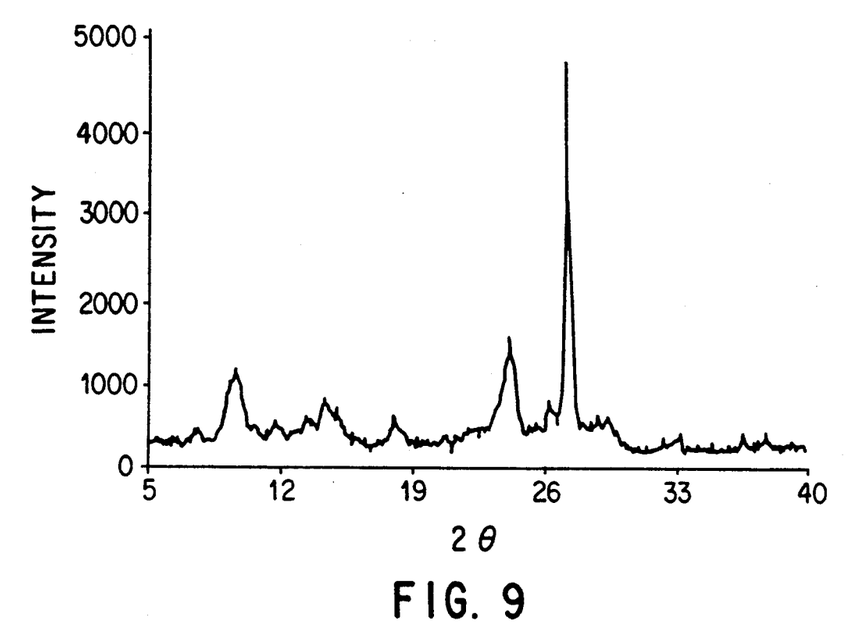
FIG. 9 is a powder X-ray diffraction pattern of the oxytitanium phthalocyanine hydrate crystal obtained in Comparative Example 2.

Two parts of the resulting oxytitanium phthalocyanine crystal were stirred in a mixed solvent consisting of 20 parts of distilled water and 2 parts of monochlorobenzene at 50° C. for 1 hour. The mixture was filtered, and the filter cake was thoroughly washed with methanol and dried to recover 1.6 parts of an oxytitanium phthalocyanine hydrate crystal. The powder X-ray diffraction pattern of the resulting oxytitanium phthalocyanine hydrate crystal is shown in FIG. 9. The crystal had a non-uniform particle size ranging from 0.03 and 0.2 μm.

When the resulting crystal was dried at 100° C., 0.1 mmHg for 8 hours and then allowed to stand in air at room temperature for 12 hours, the crystal had a structural formula of $TiOPc \cdot (H_2O)_{0.45}$.

COMPARATIVE EXAMPLE 3

Figure 10:
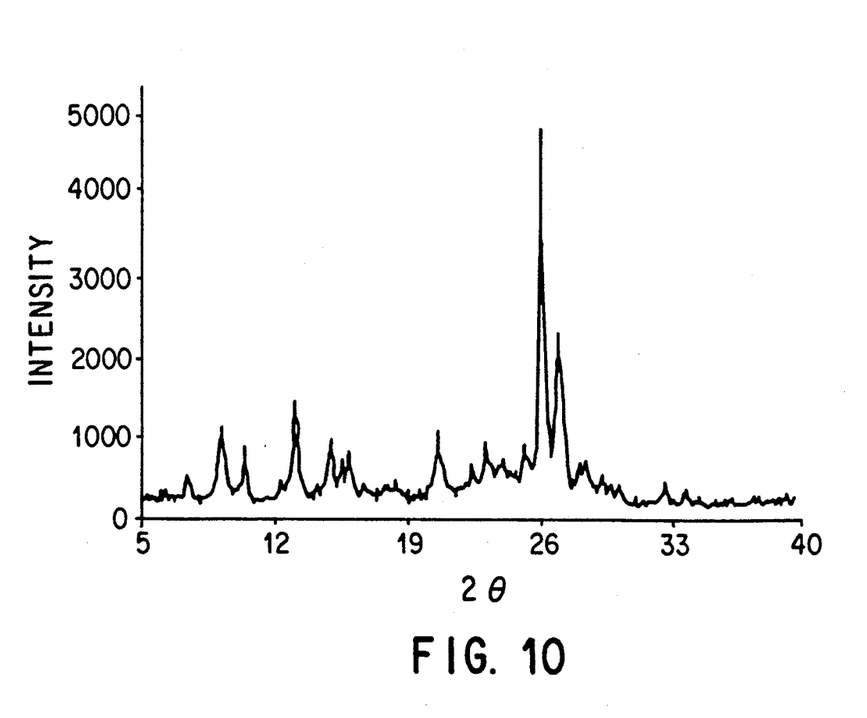
FIG. 10 is a powder X-ray diffraction pattern of the oxytitanium phthalocyanine crystal obtained in Comparative Example 3.

The same procedure as in Example 1 was repeated, except for replacing the distilled water/monochlorobenzene mixed solvent with 20 parts of dimethylformamide. The powder X-ray diffraction pattern of the resulting oxytitanium phthalocyanine crystal is shown in FIG. 10. The resulting crystal had a substantially uniform particle size of from 0.05 to 0.12 μm.

COMPARATIVE EXAMPLE 4

Figure 11:
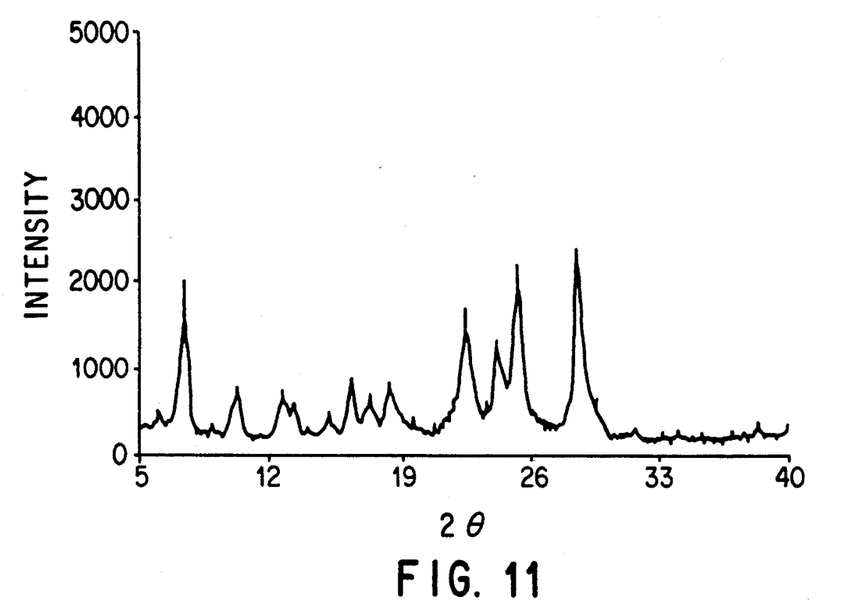
FIG. 11 is a powder X-ray diffraction pattern of the oxytitanium phthalocyanine crystal obtained in Comparative Example 4.

The same procedure as in Example 3 was repeated, except for replacing the distilled water/monochlorobenzene mixed solvent with 20 parts of dimethylformamide. The powder X-ray diffraction pattern of the resulting oxytitanium phthalocyanine crystal is shown in FIG. 11. The resulting crystal had a substantially uniform particle size of from 0.03 to 0.11 μm.

Each of the crystals synthesized in Synthesis Example 2, the crystals obtained after grinding and after solvent treatment in Examples 1 to 3, and the crystals obtained after solvent treatment in Comparative Examples 1 to 4 was dried at 100° C and 0.1 mmHg for 8 hours and allowed to stand in air at room temperature for 12 hours. The elemental analysis values and the weight loss on heating up to 200° C. of the thus conditioned crystal are shown in Table 1 below.

TABLE 1

| Example No. | Treatment | Found Values of Elemental Analysis | | | Weight Loss on Heating (%) |
|---|---|---|---|---|---|
| | | C (%) | H (%) | N (%) | |
| Synthesis Example 2 | — | 65.58 | 2.40 | 18.77 | 0.7 |
| Example 1 | grinding | 66.20 | 2.85 | 18.96 | 0.5 |
| Example 1 | solvent treatment | 66.11 | 2.70 | 18.65 | 1.1 |
| Example 2 | grinding | 66.25 | 2.83 | 18.85 | 0.5 |
| Example 2 | solvent treatment | 65.95 | 2.75 | 18.71 | 1.3 |
| Example 3 | grinding | 66.21 | 2.88 | 18.97 | 0.4 |
| Example 3 | solvent treatment | 65.90 | 2.80 | 18.70 | 1.5 |
| Compara. Example 1 | solvent treatment | 66.15 | 2.85 | 18.60 | 0.9 |
| Compara. Example 2 | solvent treatment | 66.21 | 2.79 | 18.65 | 1.4 |
| Compara. Example 3 | solvent treatment | 66.71 | 2.70 | 19.30 | 0.2 |
| Compara. Example 4 | solvent treatment | 66.55 | 2.71 | 19.22 | 0.1 |

Note:
*Calcd. for TiOPc: C: 66.68; H: 2.80; N: 19.44

APPLICATION EXAMPLE 1

A coating composition for subbing layer composed of 10 parts of an organozirconium compound ("ORGATICS ZC 540" produced by Matsumoto Seiyaku K.K.), 2 parts of a silane coupling agent ("A1110" produced by Nippon Unicar K.K.), 30 parts of isopropyl alcohol, and 30 parts of n-butanol was coated on an aluminum-plated substrate by dip coating and dried at 150° C. for 5 minutes to form a 0.1 μm thick subbing layer.

A mixture of 0.1 part of the oxytitanium phthalocyanine hydrate crystal obtained in Example 1, 0.1 part of polyvinyl butyral ("S-Lec BM-S" produced by Sekisui Chemical Co., Ltd.), and 10 parts of cyclohexanone was dispersed in a paint shaker together with glass beads for 1 hour to prepare a coating composition for charge generating layer. The resulting coating composition was coated on the subbing layer by dip coating and dried at 100° C. for 5 minutes to form a 0.2 μm thick charge generating layer.

In 8 parts of monochlorobenzene were dissolved 1 part of a compound of formula (1) shown below and 1 part of poly(4,4-cyclohexylidenediphenylene carbonate) of formula (2) shown below, and the resulting coating composition for charge transporting layer was coated on the charge generating layer by dip coating and dried at 120° C. for 1 hour to form a 20 μm thick charge transporting layer.

Electrophotographic characteristics of the resulting electrophotographic photoreceptor were evaluated by making the following measurements with an electrostatic copying paper analyzer ("EPA-8100" manufactured by Kawaguchi Electric K.K.) under a normal temperature and normal humidity condition (20° C., 40% RH), a low temperature and low humidity condition (10° C., 15% RH), or a high temperature and high humidity condition (28° C., 85% RH). The results obtained are shown in Table 2 below.

1) Initial Surface Potential ($V_{DDP}$)

The photoreceptor was charged to −6.0 kV by a corona discharger, and the surface potential after 1 second ($V_{DDP}$) was measured.

2) Decay Rate ($E_{\frac{1}{2}}$)

The negatively charged photoreceptor was exposed to monochromatic light (800 nm) isolated through a band transmission filter to determine a decay rate of the electric potential ($E_{\frac{1}{2}}$)

3) Residual Potential ($V_{RP}$)

The photoreceptor was exposed to white light of 50 erg/cm² for 0.5 second, and the residual surface potential ($V_{RP}$) was measured.

4) Stability

A variation of $E_{\frac{1}{2}}$ ($\Delta E_{\frac{1}{2}}$) depending on the change of environmental conditions was obtained.

5) Durability

The above-described charging and exposure were repeated 1,000 times, and $V_{DDP}$ and $V_{RP}$ were measured to obtain a difference from those in the initial stage ($\Delta V_{DDP}$, $\Delta V_{RP}$).

APPLICATION EXAMPLES 2 AND 3

An electrophotographic photoreceptor was produced in the same manner as in Application Example 1, except for replacing the oxytitanium phthalocyanine hydrate crystal of Example 1 with the charge generating material shown in Table 2. The resulting photoreceptor was evaluated in the same manner as in Application Example 1, and the results obtained are shown in Table 2.

REFERENCE EXAMPLES 1 TO 6

An electrophotographic photoreceptor was produced in the same manner as in Application Example 1, except for replacing the oxytitanium phthalocyanine hydrate crystal of Example 1 with the phthalocyanine crystal shown in Table 2. The resulting photoreceptor was evaluated in the same manner as in Application Example 1, and the results obtained are shown in Table 2.

Bragg angles ($2\theta \pm 0.2°$) of 7.2°, 14.2°, 17.8°, 24.1°, and 27.3°.

TABLE 2

| Example No. | Charge Generating Material | Initial Electrophotographic Characteristics | | | Stability Durability | | |
|---|---|---|---|---|---|---|---|
| | | $V_{DDP}$ (V) | $E_{\frac{1}{2}}$ (erg/cm$^2$) | $V_{RP}$ (V) | $\Delta E_{\frac{1}{2}}$ (erg/cm$^2$) | $\Delta V_{DDP}$ (V) | $\Delta V_{RP}$ (V) |
| Application Example 1 | hydrate crystal of Example 1 | −850 | 1.4 | −2 | 0.1 | 10 | 5 |
| Application Example 2 | hydrate crystal of Example 2 | −860 | 1.3 | −3 | 0.1 | 10 | 3 |
| Application Example 3 | hydrate crystal of Example 3 | −860 | 1.3 | −2 | 0.2 | 10 | 3 |
| Reference Example 1 | ground crystal of Example 1 | −800 | 2.3 | −15 | 0.7 | 30 | 15 |
| Reference Example 2 | solvent-treated crystal of Compara. Ex. 1 | −830 | 1.8 | −8 | 0.4 | 25 | 13 |
| Reference Example 3 | solvent-treated crystal of Compara. Ex. 2 | −840 | 1.6 | −5 | 0.3 | 20 | 15 |
| Reference Example 4 | solvent-treated crystal of Compara. Ex. 3 | −820 | 4.3 | −40 | 0.5 | 15 | 10 |
| Reference Example 5 | solvent-treated crystal of Compara. Ex. 4 | −810 | 2.5 | −30 | 0.7 | 30 | 15 |
| Reference Example 6 | Synthesis Example 2 | −850 | 1.7 | −10 | 0.4 | 25 | 25 |

The present invention provides an oxytitanium phthalocyanine hydrate crystal doped with a specific amount of water of crystallization which has the maximum X-ray diffraction peak at a Bragg angle ($2\theta \pm 0.2°$) of 27.3° and which is stable in a solvent and also stable when used in an electrophotographic photoreceptor. The electrophotographic photoreceptor containing the oxytitanium phthalocyanine hydrate crystal of the present invention is excellent in stability on repeated use and against changes of environmental conditions.

While the invention has been described in detail and with reference to specific examples thereof, it will be apparent to one skilled in the art that various changes and modifications can be made therein without departing from the spirit and scope thereof.

What is claimed is:

1. A process for preparing an oxytitanium phthalocyanine hydrate crystal which, when dried at 100° C. and 0.1 mmHg for 8 hours and then allowed to stand in air at room temperature for 12 hours, has a structural formula of TiOPc·(H$_2$O)$_n$, wherein Pc represents a phthalocyanine nucleus, and n represents a number of from 0.15 to 1, and elemental analysis values of C: 65.0 to 66.3%, H: 2.5 to 3.1%, and N: 18.5 to 19.3%, said process comprising the steps of: mechanically grinding a mixture of oxytitanium phthalocyanine and an inorganic salt to convert the crystal form of the oxytitanium phthalocyanine to a crystal form showing a distinct peak in its X-ray diffraction pattern at a Bragg angle ($2\theta \pm 0.2°$) of 27.3°; and treating the resulting oxytitanium phthalocyanine crystal with a mixed solvent of water and a water-insoluble organic solvent.

2. A process as claimed in claim 1, wherein the oxytitanium phthalocyanine after the mechanical grinding shows distinct peaks in its X-ray diffraction pattern at Bragg angles ($2\theta \pm 0.2°$) of 7.2°, 14.2°, 17.8°, 24.1°, and 27.3°.

3. A process as claimed in claim 1, wherein said oxytitanium phthalocyanine hydrate crystal has a weight loss of from 0.6 to 3% on heating up to 200° C.

4. A process as claimed in claim 1, wherein said oxytitanium phthalocyanine hydrate crystal has a particle size of not more than 0.15 μm and shows the maximum peak in its X-ray diffraction pattern at Bragg angle ($2\theta \pm 0.2°$) of 27.3°.

5. A process as claimed in claim 2, wherein said oxytitanium phthalocyanine hydrate crystal has a particle size of not more than 0.15 μm and shows the maximum peak in its X-ray diffraction pattern at Bragg angle ($2\theta \pm 0.2°$) of 27.3°.

6. A process as claimed in claim 3, wherein said oxytitanium phthalocyanine hydrate crystal has a particle size of not more than 0.15 μm and shows the maximum peak in its X-ray diffraction pattern at Bragg angle ($2\theta \pm 0.2°$) of 27.3°.

7. A process as claimed in claim 1, wherein said oxytitanium phthalocyanine hydrate crystal has a particle size of not more than 0.15 μm and shows distinct peaks in its X-ray diffraction pattern at Bragg angles ($2\theta \pm 0.2°$) of 9.5°, 14.3°, 18.0°, 24.0°, and 27.3°.

8. A process as claimed in claim 2, wherein said oxytitanium phthalocyanine hydrate crystal has a particle size of not more than 0.15 μm and shows distinct peaks in its X-ray diffraction pattern at Bragg angles ($2\theta \pm 0.2°$) of 9.5°, 14.3°, 18.0°, 24.0°, and 27.3°.

9. A process as claimed in claim 3, wherein said oxytitanium phthalocyanine hydrate crystal has a particle size of not more than 0.15 μm and shows distinct peaks in its X-ray diffraction pattern at Bragg angles ($2\theta \pm 0.2°$) of 9.5°, 14.3°, 18.0°, 24.0°, and 27.3°.

10. A process as claimed in claim 1, wherein said mechanical grinding is dry grinding.

* * * * *